July 8, 1924.  
J. A. HEIDBRINK  
ANÆSTHETIZING APPARATUS  
Filed Nov. 19, 1921  
1,500,615  
5 Sheets-Sheet 2
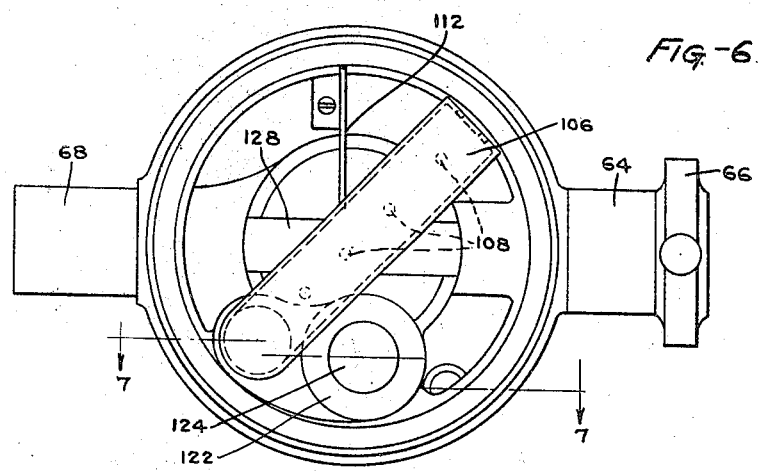
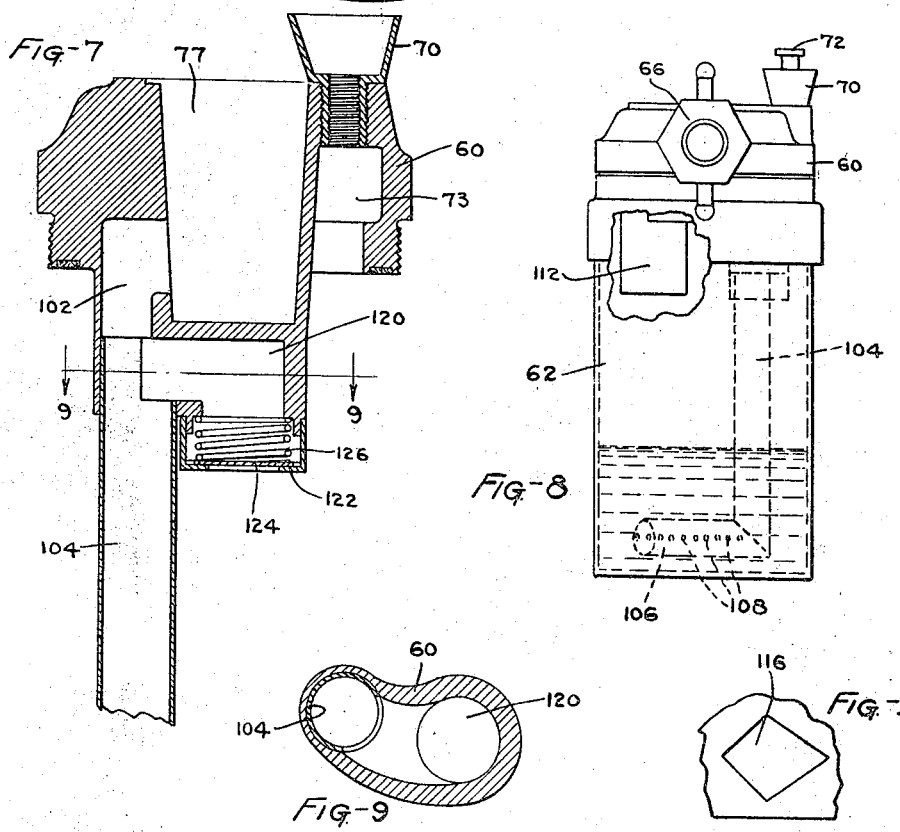
INVENTOR:  
JAY A. HEIDBRINK.  
By Whiteley and Ruckman  
ATTORNEYS July 8, 1924.

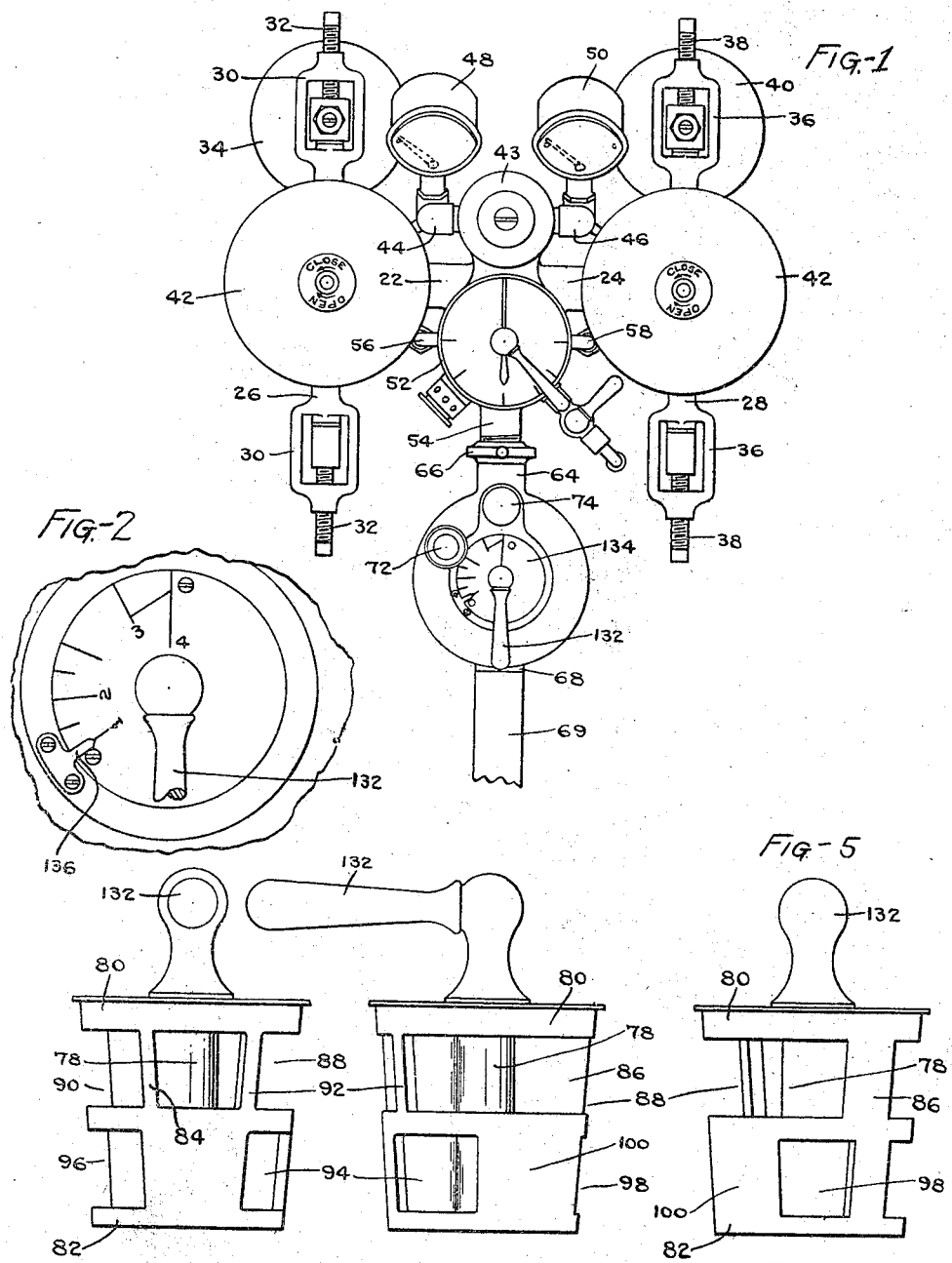

J. A. HEIDBRINK

ANÆSTHETIZING APPARATUS

Filed Nov. 19, 1921

1,500,615

5 Sheets-Sheet 3

INVENTOR:
JAY A. HEIDBRINK.
BY Whiteley
and Ruckman
ATTORNEYS

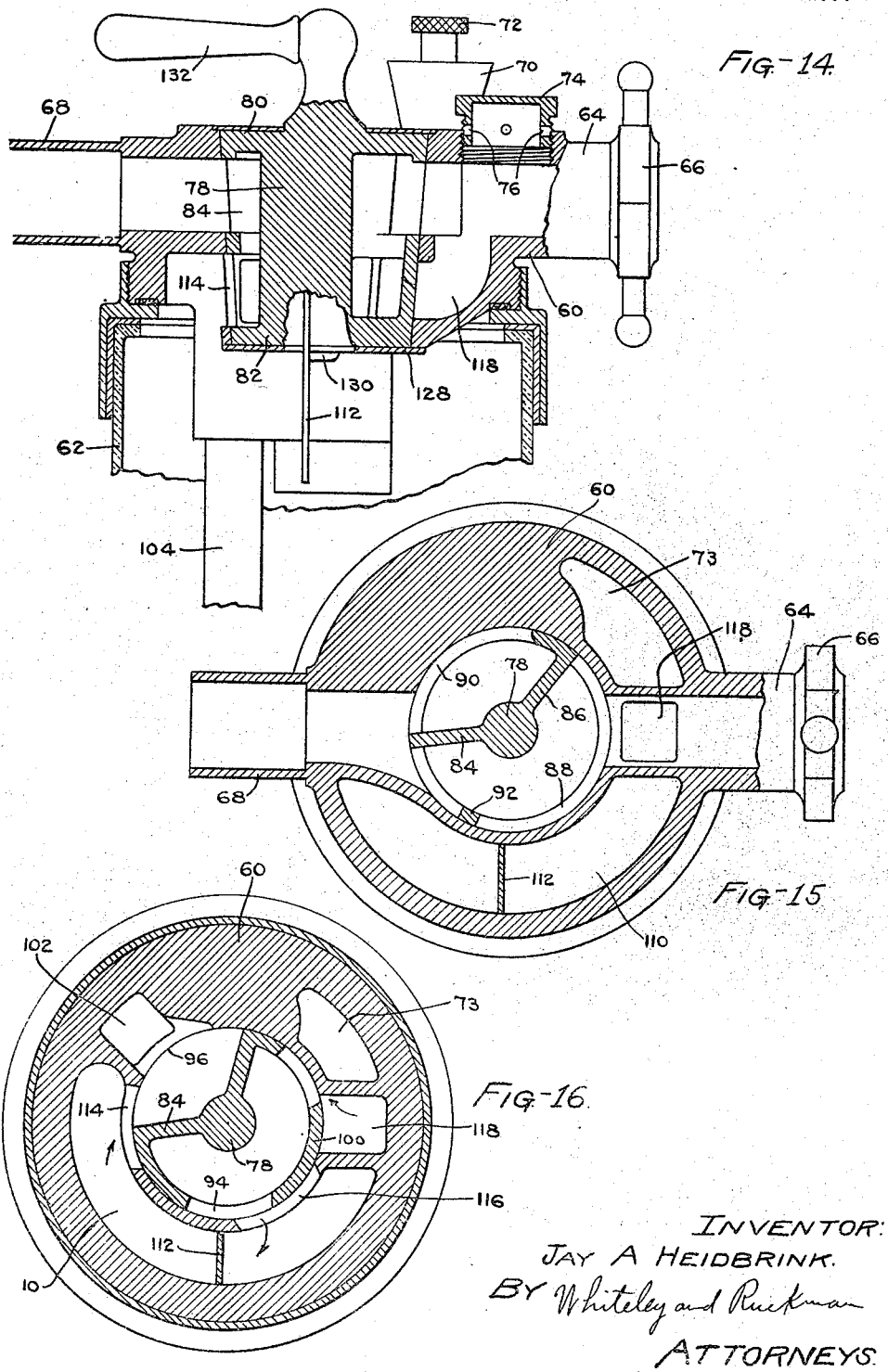

July 8, 1924.

J. A. HEIDBRINK
ANÆSTHETIZING APPARATUS
Filed Nov. 19, 1921

1,500,615

5 Sheets-Sheet 5

INVENTOR:
JAY A. HEIDBRINK.
By Whitley
and Ruckman
ATTORNEYS

Patented July 8, 1924.

1,500,615

UNITED STATES PATENT OFFICE.

JAY A. HEIDBRINK, OF MINNEAPOLIS, MINNESOTA.

ANÆSTHETIZING APPARATUS.

Application filed November 19, 1921. Serial No. 516,333.

*To all whom it may concern:*

Be it known that I, JAY A. HEIDBRINK, a citizen of the United States, residing at Minneapolis, in the county of Hennepin and State of Minnesota, have invented certain new and useful Improvements in Anæsthetizing Apparatus, of which the following is a specification.

My invention relates to anæsthetizing apparatus, and more particularly to an ether vaporizer which is adapted to be used in connection with an apparatus used for administering gaseous anæsthetics such as nitrousoxid and oxygen. An object of my invention is to provide a device of this character which may be readily controlled by the operator in such manner that either the gaseous mixture alone or the ether alone may be administered or desired varying amounts of ether may be introduced into the mixture of gases passing from the mixing chamber or into air which is allowed to pass into the apparatus so as to be delivered to the inhaler. Another object is to provide an ether vaporizer having a single valve adapted to be rotated by the operator for causing the anæsthetic to be supplied to the inhaler in accordance with any of the above mentioned conditions.

The full objects and advantages of my invention will appear in connection with the detailed description, and the novel features embodied in my inventive idea will be particularly pointed out in the claims.

In the accompanying drawings which illustrate the operation of my invention in one form,—

Figure 11:
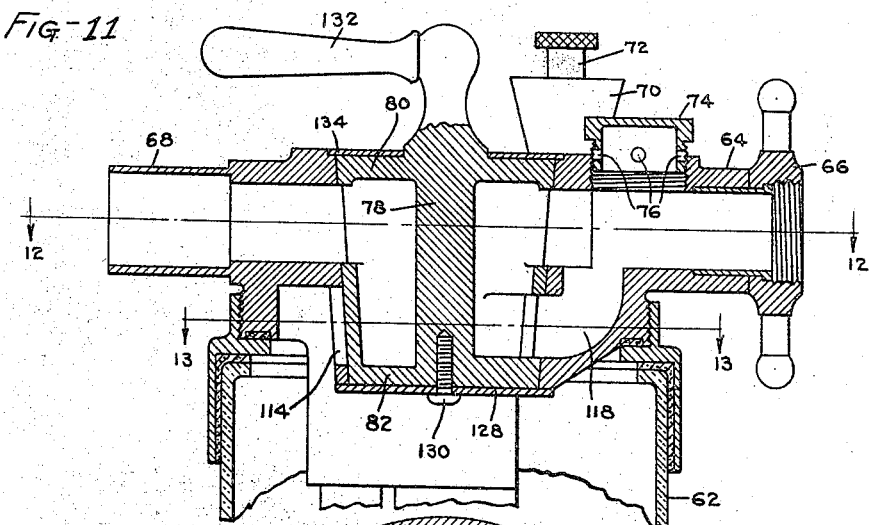
Figure 12:
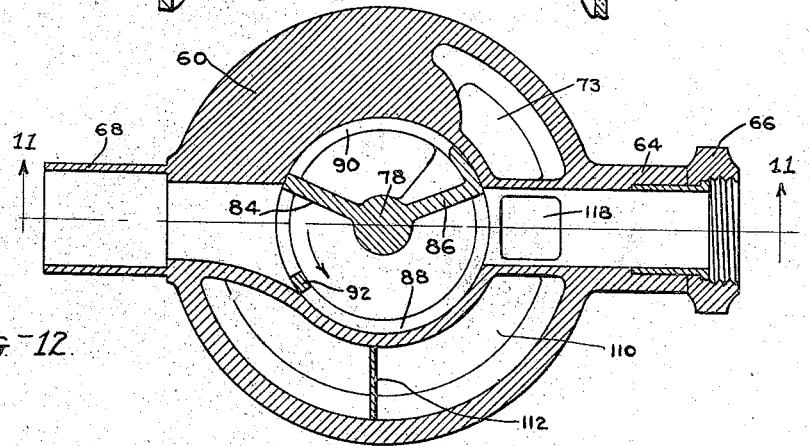
Figure 13:
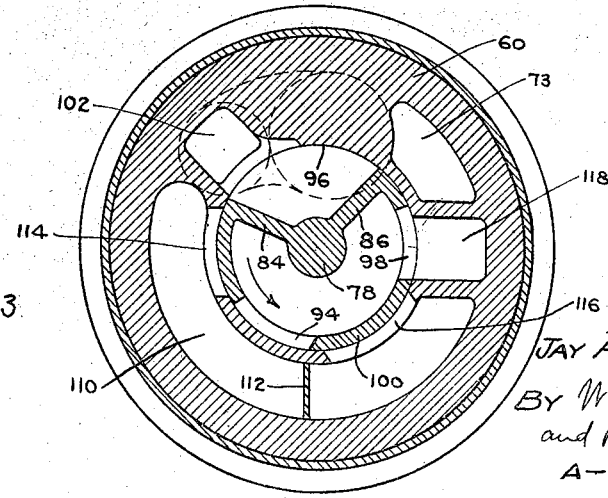
Figure 17:
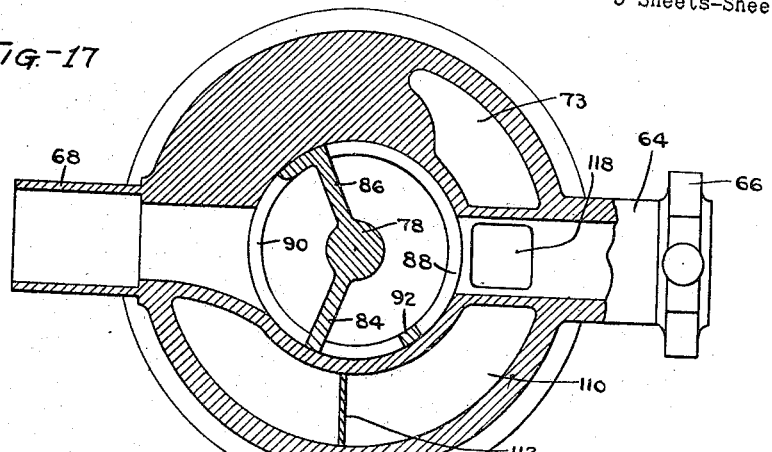
Figure 18:
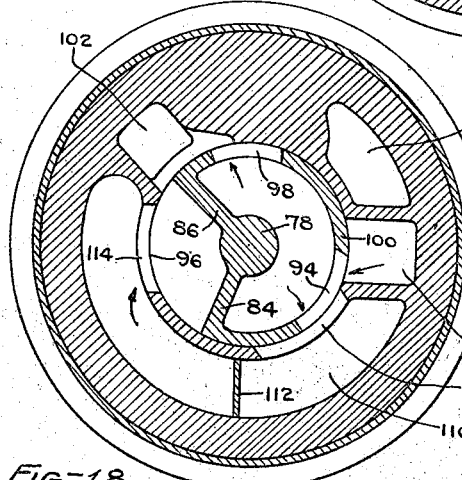
Figure 20:
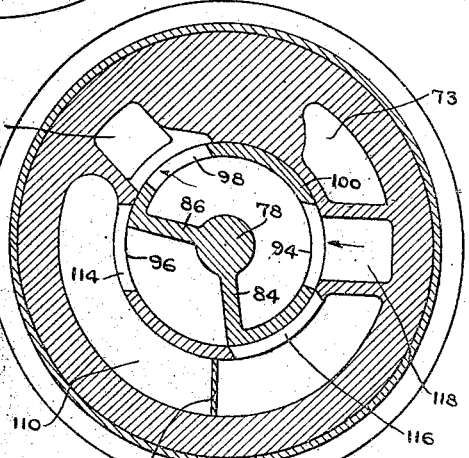
Figure 19:
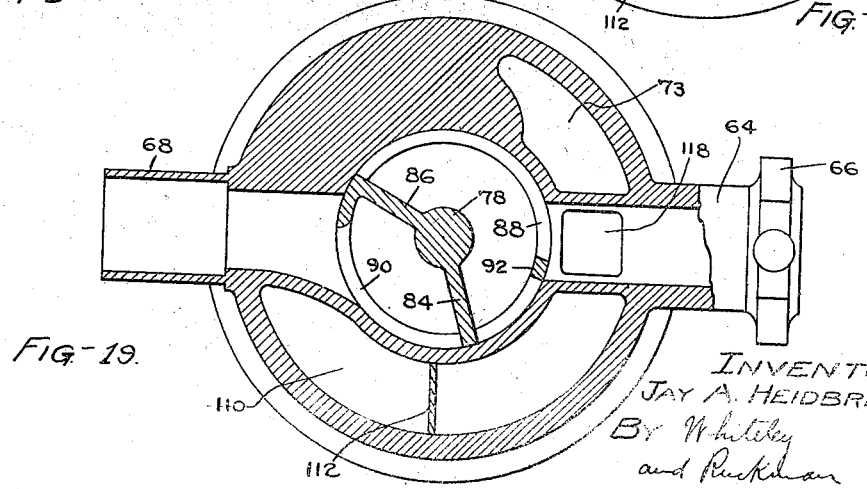

Fig. 1 is a top plan view of an anæsthetizing apparatus for supplying gaseous anæsthetics having the ether vaporizer attached thereto. Fig. 2 is an enlarged top plan view of an indicator mounted on the top of a rotatable valve. Fig. 3 is an elevational view of the rotatable valve as it is viewed from the left in Figs. 11, 12 and 13. Fig. 4 is an elevational view of the valve at right angles to Fig. 3, and as the valve is viewed from the bottom of the views in Figs. 11, 12 and 13. Fig. 5 is an elevational view of the valve at right angles to Fig. 4 and shows the side opposite that shown in Fig. 3. Fig. 6 is a bottom plan view of the ether vaporizer. Fig. 7 is a view in section on the line 7—7 of Fig. 6. Fig. 8 is a side elevational view of the ether vaporizer. Fig. 9 is a view in horizontal section on the line 9—9 of Fig. 7. Fig. 10 is a detail view showing an opening in the wall of the casting which constitutes the valve casing. Fig. 11 is a view in section on the line 11—11 of Fig. 12. Fig. 12 is a view in section on the line 12—12 of Fig. 11. Fig. 13 is a view in section on the line 13—13 of Fig. 11, these three last mentioned views showing the valve in position #1 indicated in Fig. 2. Figs. 14, 15 and 16 are views similar to Figs. 11, 12 and 13 with the valve in position #2. Figs. 17 and 18 are views similar to Figs. 12 and 13 showing the valve in position #3. Figs. 19 and 20 are views similar to Figs. 12 and 13 with the valve in position #4.

Referring to the construction shown in the drawings, Fig. 1 shows my ether vaporizer attached for use in connection with an anæsthetizing apparatus which is adapted to administer a plurality of gases such as nitrousoxid and oxygen. This anæsthetizing apparatus may be that which is disclosed in an application filed by me November 17, 1921, S. N. 515,782 and the construction of which it is not necessary to describe in detail. As shown in this figure, there are a pair of arms 22 and 24 supported in suitable manner which carry the cross bars 26 and 28 respectively. The ends of the cross bars 26 are provided with yokes 30 within which the heads of gas containers are adapted to be secured by screws 32. The containers attached to the yokes 30 are intended for holding oxygen and one of them is designated by the numeral 34. The ends of the cross bar 28 are provided with yokes 36 within which the heads of gas containers are adapted to be secured by screws 38. The gas containers attached to these latter yokes are intended for holding nitrousoxid and one of them is designated by the numeral 40. Both sets of gas containers are adapted to deliver gas through pressure controlling devices 42 into a mixing chamber positioned underneath a valve head 43 to which the gas passes through pipes 44 and 46 connected respectively to an oxygen pressure gauge 48 and a nitrousoxid pressure gauge 50. The valve head has openings leading into the mixing chamber and from the latter the mixed gases may be passed through a rotatable valve contained in a valve casing 52 having a short pipe 54 which is connected directly to an inhaling device when my ether vaporizer is not attached to the pipe 54. Pipes 56 and 58 leading from the two pressure controlling devices into the valve casing serve to supply pure nitrousoxide or pure oxygen when desired. When the ether vaporizer is to be used, it may be attached to the pipe 54 so as to be interposed between the nitrousoxid-oxygen apparatus and the inhaler. The ether vaporizer includes a casting 60 to the underside of which a jar 62 for containing ether is attached. The casting 60 is partly hollowed out and from one side thereof extends a tubular member 64 having a screw-threaded coupling device 66 for attachment to the pipe 54. From the other side of the casting a passageway extends out through a tubular member 68 to which the tubing 69 leading to the inhaler may be attached. Threaded into a vertical opening in the casting 60 is a funnel member 70 through which ether may be introduced into the jar 62, the funnel opening then being closed by a screw plug 72. Below the funnel is the passageway 73 which is contracted on its lower portion and opens into the jar. The tubular member 64 is provided with a screw-threaded opening for receiving an externally threaded cap 74, the threaded portion of which is provided with holes 76. When this cap is screwed down no air can pass into the vaporizer, while by partly unscrewing the cap air in different amounts may be admitted through the holes 76 for the purpose of carrying the ether vapor to the inhaler. The casting 60 contains a recess 77 for receiving a rotatable valve which has the core or stem 78, the upper end of which carries an upper wall member 80, and the lower end of which carries a lower wall member 82. These two wall members are joined by a peripheral wall member which is partly cut out to form a number of ports which will presently be described, while two wings 84 and 86 extend from the core to the peripheral wall member. The upper portion of the peripheral wall is provided with two ports 88 and 90 separated from each other by the wings 84 and 86. A strengthening web 92 extends across the port 88, this web being merely a portion of the peripheral wall which is not cut away. The lower portion of the peripheral wall of the valve is provided with three ports 94, 96 and 98, the two ports 94 and 98 being separated from each other by a peripheral wall portion 100. As best shown in Fig. 7 there is a passageway 102 in the casting 60 extending from the valve recess 77 through the bottom of the casting and connecting with a tube 104 which extends down into the jar 62, the lower portion of this tube being turned at right angles to form a horizontal member 106 which is provided with perforations 108 which are located beneath the surface of the ether placed in the jar. The casting 60 is also provided with an arcuate passage 110, the end portions of which are separated by a baffle plate 112 extending for a short distance down into the jar 62. The portions of the passageway 110 at opposite sides of the baffle plate are adapted to communicate with the valve recess though openings 114 and 116, the shape of the latter being shown in Fig. 10. The casting at the inner end of the tubular member 64 is provided with a downwardly and inwardly curved passage 118, best shown in Fig. 11 with which any one of the ports 94, 96 and 98 may be placed in communication by rotating the valve. The bottom of the casting 60 is provided with a passageway 120 shown in Fig. 7, the upper portion of which connects with the passageway 102 and the lower portion of which is provided with a valve seat 122 against which a valve 124 is normally held in downward position by a spring 126. The rotatable valve is held in place in the valve recess by means of a strip 128 secured to its lower wall by means of a screw 130, this strip being of such length that its ends engage under the lower walls of the valve recess. A handle 132 secured to the upper end of the valve enables the operator to turn the valve into different positions for varying the anæsthetic which is administered as may be considered desirable. The upper surface of this valve carries a dial 134 which bears indicating marks which may be made to register when turned with a pointer 136 secured to the casing. Referring to Fig. 2, the marks indicated as numbers 1, 2, 3, and 4 correspond to the main positions of the rotatable valve, it being understood that intermediate marks correspond to positions of the valve intermediate the main positions thereof.

The operation and advantages of my invention will be readily understood in connection with the foregoing description. When the valve is in #1 position as indicated in Fig. 2 and as shown in Figs. 11, 12 and 13, the port 88 establishes direct communication between the mixing chamber and the inhaler as will be apparent from Fig. 12 so that a mixture of nitrousoxide and oxygen is supplied to the inhaler. At the same time the openings 114 and 116 are closed as will be seen from Fig. 13 and none of the ether in the jar can pass to the inhaler. When the valve is in #2 position, as shown in Figs. 14, 15 and 16, the port 88 still establishes a communication between the mixing chamber and the inhaler so that the gaseous mixture may pass but the openings 114 and 116 have been uncovered so that some of the gaseous mixture or air passing through the cap 74 will pass through the port 98 and opening 116 into the arcuate passageway 110 and will be caused by the deflector 112 to dip down into the upper portion of the ether jar and carry a small amount of ether vapor through the opening 114 to mingle with the rest of the gaseous mixture or air. When the valve is in #3 position as shown in Figs. 17 and 18, the passageway directly through the valve is blocked by the wings 84 and 86. At this time the cap 74 will ordinarily be unscrewed sufficiently to permit the desired quantity of air to pass through the openings 76. Some of the air will pass through the opening 116 into the passageway 110 down under the deflector 112 picking up some of the ether vapor at the top of the jar and will finally pass out through the opening 114 to the inhaler. Another portion of the air will pass through the port 98 into the passageway 102 and down the tube 104 so as to bubble up through the ether by way of perforations 108, thus causing vaporization of the ether. The pressure of the ether vapor causes the valve 124 to open, thus allowing the vapor to pass through the passageway 120 to the inhaler. When the valve is in position #4 as shown in Figs. 19 and 20, the passageway directly through the valve is still blocked by the wings 84 and 86, and in addition the opening 116 is closed as seen in Fig. 20. All of the air will now pass through the ports 94 and 98 into the passageway 102 and down the tube 104 so as to bubble up through the ether, thus causing a greater amount of ether vapor to be supplied to the inhaler than is the case of any of the other positions of the valve.

I claim:

1. An anæsthetizing apparatus comprising an inhaler, a head member with which said inhaler is connected, an ether receptacle attached to said head member, means for supplying gaseous medium to said head member, a tube extending down into said receptacle and a shiftable valve in said head member having ports so arranged that the valve when in one position causes all of the gaseous medium to pass directly from said head member to said inhaler and when in another position causes a portion of the gaseous medium to pass directly from said head member to said inhaler, and the remaining portion of the gaseous medium to pass directly through the upper portion of said ether receptacle before passing to said inhaler and when in another position causes a portion of the gaseous medium to pass directly through the upper portion of said receptacle, and another portion of the gaseous medium to pass down said tube into the ether in said receptacle before passing to said inhaler.

2. An anæsthetizing apparatus comprising an inhaler, a head member with which said inhaler is connected, an ether receptacle attached to said head member, means for supplying gaseous medium to said head member, a tube extending down into said receptacle, a shiftable valve in said head member having ports so arranged that the valve when in one position causes all of the gaseous medium to pass directly from said head member to said inhaler and when in another position causes a portion of the gaseous medium to pass directly from said head member to said inhaler, and the remaining portion of the gaseous medium to pass through the upper portion of said ether receptacle before passing to said inhaler and when in another position causes a portion of the gaseous medium to pass directly through the upper portion of said receptacle, and another portion of the gaseous medium to pass down said tube into the ether in said receptacle before passing to said inhaler, and when in another position causes all of the gaseous medium supplied to said head member to pass down said tube into the ether in said receptacle before passing to said inhaler.

3. An anæsthetizing apparatus comprising an inhaler, a head member with which said inhaler is connected, an ether receptacle attached to said head member, means for supplying gaseous medium to said head member, a tube extending down into said receptacle, and a single shiftable valve in said head member having ports so arranged that the valve when in one position causes the gaseous medium to pass directly from said head member to said inhaler, and when in another position causes a portion of the gaseous medium to pass directly from said head member to said inhaler, and another portion of the gaseous medium to pass through the upper portion of said receptacle before passing to said inhaler, and when in another position causes all of the gaseous medium supplied to said head member to pass down said tube into the ether in said receptacle before passing to said inhaler.

4. An anæsthetizing apparatus comprising an inhaler, a head member with which said inhaler is connected, an ether receptacle attached to said head member, means for supplying gaseous medium to said head member, a tube extending down into said receptacle, and a single shiftable valve in said head member having ports so arranged that the valve when in one position causes the gaseous medium to pass directly from said head member to said inhaler and when in another position causes a portion of the gaseous medium to pass through the upper portion of said receptacle, and another portion of the gaseous medium to pass down said tube into the ether in said receptacle before passing to said inhaler, and when in another position causes all of the gaseous medium supplied to said head member to pass down said tube into the ether in said receptacle before passing to said inhaler.

5. An anæsthetizing apparatus comprising an inhaler, a head member with which said inhaler is connected, an ether receptacle attached to said head member, means for supplying gaseous medium to said head member, a tube extending down into said receptacle, and a single shiftable valve having ports so arranged that the valve when in one position causes a portion of the gaseous medium to pass through the upper portion of the ether receptacle, and another portion of the gaseous medium to pass down said tube into the ether in said receptacle before passing to said inhaler, and when in another position causes all of the gaseous medium supplied to said head member to pass down said tube into the ether in said receptacle before passing to said inhaler.

6. An anæsthetizing apparatus comprising an inhaler, a head member with which said inhaler is connected, an ether receptacle attached to said head member, means on said head member adapted to open and close communication between the interior thereof and the outside atmosphere, a passageway for conveying gaseous anæsthetic to the interior of said head member, an ether receptacle attached to said head member, and a single shiftable valve in said head member having ports so arranged that when the valve is in one position gaseous anæsthetic will be caused to pass directly to said inhaler, and when in another position air will be caused to pass through said receptacle and then to said inhaler.

7. An anæsthetizing apparatus comprising an inhaler, a head member with which said inhaler is connected, an ether receptacle attached to said head member, a passageway for conveying gaseous anæsthetic to the interior of said head member, an ether receptacle attached to said head member, a by-pass passageway in said head member, a deflector in said by-pass passageway extending down into the upper portion of said receptacle, and a single rotatable valve in said head member having ports so arranged that when the valve is in one position gaseous anæsthetic will be caused to pass directly through the valve to said inhaler, and when in another position a portion of the gaseous anæsthetic will be caused to pass directly through the valve to the inhaler, and another portion of the gaseous anæsthetic will be caused to pass into said by-pass passageway and under said deflector before passing to said inhaler.

8. An anæsthetizing apparatus comprising an inhaler, a head member with which said inhaler is connected, an ether receptacle attached to said head member, means on said head member adapted to open and close communication between the interior thereof and the outside atmosphere, a passageway for conveying gaseous anæsthetic to the interior of said head member, an ether receptacle attached to said head member, a by-pass passageway in said head member, a deflector in said by-pass passageway extending down into the upper portion of said receptacle, a tube extending down into said receptacle, and a rotatable valve in said head member having ports so arranged that when the valve is in one position gaseous anæsthetic will be caused to pass directly through the valve to said inhaler and when in another position a portion of the gaseous anæsthetic will be caused to pass directly through the valve to said inhaler, and another portion of the gaseous anæsthetic will be caused to pass into said by-pass passageway and under said deflector before passing to said inhaler, and when in another position a portion of the air supplied to said head member will be caused to pass into said by-pass passageway and under said deflector before passing to said inhaler, and another portion of the air will be caused to pass down said tube into the ether contained in said receptacle before passing to said inhaler, and when in another position all of the air supplied to said head member will be caused to pass down said tube into the ether contained in said receptacle before passing to said inhaler.

In testimony whereof I hereunto affix my signature.

JAY A. HEIDBRINK.